(12) United States Patent
Jin et al.

(10) Patent No.: US 12,530,894 B2
(45) Date of Patent: Jan. 20, 2026

(54) INCREMENTAL VIDEO HIGHLIGHTS DETECTION SYSTEM AND METHOD

(71) Applicants: Lemon Inc., Grand Cayman (KY); Beijing Zitiao Network Technology Co., Ltd., Beijing (CN)

(72) Inventors: Xiaojie Jin, Los Angeles, CA (US); Sen Pei, Beijing (CN)

(73) Assignees: Lemon Inc., Grand Cayman (KY); Beijing Zitiao Network Technology Co., Ltd., Beijing (CN)

( * ) Notice: Subject to any disclaimer, the term of this patent is extended or adjusted under 35 U.S.C. 154(b) by 437 days.

(21) Appl. No.: 18/057,691

(22) Filed: Nov. 21, 2022

(65) Prior Publication Data

US 2024/0177486 A1 May 30, 2024

(51) Int. Cl.
*G06V 20/40* (2022.01)
*G06N 3/0464* (2023.01)
(Continued)

(52) U.S. Cl.
CPC .............. *G06V 20/46* (2022.01); *G06V 10/62* (2022.01); *G06V 10/774* (2022.01);
(Continued)

(58) Field of Classification Search
CPC ...... G06V 20/46; G06V 10/62; G06V 10/774; G06V 10/776; G06V 10/806; G06V 10/82;
(Continued)

(56) References Cited

U.S. PATENT DOCUMENTS 11,748,940 B1 * 9/2023 Xian ..................... G06T 15/205
345/419
2016/0292510 A1 * 10/2016 Han ........................ G11B 27/28
(Continued)

FOREIGN PATENT DOCUMENTS

CN 114998797 A * 9/2022 ........... G06V 10/774

OTHER PUBLICATIONS

Desgraupes, Bernard. "Clustering indices." Â University of Paris Ouest-Lab ModalâXÂ 1.1 (2013): 34. (Year: 2013).*
(Continued)

*Primary Examiner* — Amandeep Saini
*Assistant Examiner* — Andrew S Budisalich
(74) *Attorney, Agent, or Firm* — Alleman Hall & Tuttle LLP

(57) ABSTRACT

Systems and methods are provided that include a processor executing a video classifying program to receive an input video, sample video frames from the input video, extract frame-wise spatial features from the video frames using a convolutional neural network, extract a frame-wise temporal feature for each video frame, aggregate the frame-wise spatial features and the frame-wise temporal feature for each video frame to provide a temporal context to the frame-wise spatial features, input the aggregated frame-wise spatial features and the frame-wise temporal feature for each frame into a transformer encoder to obtain temporal-aware feature representations of the video frames, input the feature representations into a feedforward network model to obtain feedforward-transformed features, obtain a parameter by inputting each feedforward-transformed feature and a set of highlight prototypes into a function comparing the feedforward-transformed features to the set of highlight prototypes, classify the video frames as highlights based on the calculated parameter.

20 Claims, 9 Drawing Sheets

(51) Int. Cl.
G06N 3/09 (2023.01)
G06V 10/62 (2022.01)
G06V 10/774 (2022.01)
G06V 10/776 (2022.01)
G06V 10/80 (2022.01)
G06V 10/82 (2022.01)
H04N 21/44 (2011.01)

(52) U.S. Cl.
CPC .......... G06V 10/776 (2022.01); G06V 10/806 (2022.01); G06V 10/82 (2022.01); G06V 20/41 (2022.01)

(58) Field of Classification Search
CPC ............. G06V 20/41; H04N 21/44008; G06N 3/0464; G06N 3/09
See application file for complete search history.

(56) References Cited

U.S. PATENT DOCUMENTS

| | | | | |
|---|---|---|---|---|
| 2020/0151503 | A1* | 5/2020 | Wang | G06F 18/214 |
| 2020/0183928 | A1* | 6/2020 | Wu | G06N 5/022 |
| 2020/0250279 | A1* | 8/2020 | Kantor | G06N 3/047 |
| 2022/0067383 | A1* | 3/2022 | Hu | G06V 10/774 |
| 2022/0180206 | A1* | 6/2022 | Fukuda | G06N 3/045 |
| 2022/0319549 | A1* | 10/2022 | Lee | G06V 10/62 |
| 2025/0014344 | A1* | 1/2025 | Freytag | G06T 7/0012 |

OTHER PUBLICATIONS

Guo, Cai, et al. "Multi-stage attentive network for motion deblurring via binary cross-entropy loss." Entropy 24.10 (2022): 1414. (Year: 2022).*

Aljundi, R. et al., "Gradient based sample selection for online continual learning," Advances in Neural Information Processing Systems 32: Annual Conference on Neural Information processing Systems 2019, NeurIPS 2019, Dec. 8, 2019, Vancouver, BC, Canada, 13 pages.

Badamdorj, T. et al., "Joint Visual and Audio Learning for Video Highlight Detection," Proceedings of the IEEE/CVF International Conference on Computer Vision (ICCV), Oct. 10, 2021, Montreal, QC, Canada, 11 pages.

Badamdorj, T. et al., "Contrastive Learning for Unsupervised Video Highlight Detection," Proceedings of the IEEE/CVF Conference on Computer Vision and Pattern Recognition (CVPR), Jun. 21, 2022, New Orleans, Louisiana, 11 pages.

Benjamin, A. et al., "Measuring and Regularizing Networks in Function Space," 7th International Conference on Learning Representations, ICLR 2019, May 6, 2019, New Orleans, Louisiana, 18 pages.

Bhattacharya, U. et al. "HighlightMe: Detecting Highlights from Human-Centric Videos," Proceedings of the IEEE/CVF International Conference on Computer Vision (ICCV), Oct. 10, 2021, Montreal, QC, Canada, 11 pages.

Buzzega, P. et al., "Dark Experience for General Continual Learning: a Strong, Simple Baseline," Advances in Neural Information Processing Systems 33: Annual Conference on Neural Information Processing Systems 2020, NeurIPS 2020, Dec. 6, 2020, Virtual, 24 pages.

Carion, N. et al., "End-to-End Object Detection with Transformers, " Computer Vision—ECCV 2020—16th European Conference, Aug. 23, 2020, Glasgow, UK, 26 pages.

Cha, H. et al., "Co2L: Contrastive Continual Learning," International Conference on Computer Vision, ICCV 2021, Oct. 10, 2021, Montreal, QC, Canada, 14 pages.

Chaudhry, A. et al., "Efficient Lifelong Learning With A-Gem," 7th International Conference on Learning Representations, ICLR 2019, May 6, 2019, New Orleans, Louisiana, 20 pages.

Chaudhry, A. et al., "Using Hindsight to Anchor Past Knowledge in Continual Learning," The Eleventh Symposium on Educational Advances in Artificial Intelligence, EAAI 2021, Feb. 2, 2021, Virtual, 19 pages.

De Lange, M. et al., "Continual Prototype Evolution: Learning Online from Non-Stationary Data Streams," IEEE/CVF International Conference on Computer Vision, ICCV 2021, Oct. 10, 2021, Montreal, QC, Canada, 11 pages.

De Lange, M. et al., "A continual learning survey: Defying forgetting in classification tasks," IEEE Transactions on Pattern Analysis and Machine Intelligence, Feb. 2021, 29 pages.

Fajtl, J. et al., "Summarizing Videos with Attention," Computer Vision—ACCV 2018 Workshops—14th Asian Conference on Computer Vision, Dec. 2, 2018, Perth, Australia, 16 pages.

Fernando, C. et al., "PathNet: Evolution Channels Gradient Descent in Super Neural Networks," CoRR abs/1701.08734, Jan. 2017, 16 pages.

Gygli, M. et al., "Creating Summaries from User Videos," Computer Vision—ECCV 2014, Zurich, Switzerland, Sep. 6, 2014, 16 pages.

Gygli, M. et al., "Video2GIF: Automatic Generation of Animated GIFs from Video," Proceedings of the 2018 ACM on Multimedia Conference, MM '18, New York, New York, Oct. 22, 2018, 9 pages.

He, K. et al., "Deep Residual Learning for Image Recognition," Proceedings of the IEEE conference on computer vision and pattern recognition, Jun. 27, 2016, 12 pages.

Isele, D. et al., "Selective Experience Replay for Lifelong Learning," 8th AAAI Symposium on Educational Advances in Artificial Intelligence (EAAI-18), Feb. 2, 2018, New Orleans, Louisiana, 9 pages.

Kirkpatrick, J. et al., "Overcoming catastrophic forgetting in neural networks," Proceedings of the National Academy of Sciences, Dec. 2016, 13 pages.

Lei, J. et al., "QVHIGHLIGHTS: Detecting Moments and Highlights in Videos via Natural Language Queries," Advances in Neural Information Processing Systems, Dec. 6, 2021, Virtual, 18 pages.

Liu, M. et al., "Cross-modal Moment Localization in Video," 2018 ACM Multimedia Conference on Multimedia Conference, MM 2018, Oct. 22, 2018, Seoul, Republic of Korea, 9 pages.

Liu, Z. et al., "A ConvNet for the 2020s," Proceedings of the IEEE/CVF Conference on Computer Vision and Pattern Recognition (CVPR), Jun. 19, 2022, New Orleans, Louisiana, 15 pages.

Lopez-Paz, D. et al., "Gradient Episodic Memory for Continual Learning," Advances in Neural Information Processing Systems 30: Annual Conference on Neural Information Processing Systems 2017, Dec. 4, 2017, Long Beach, California, 17 pages.

Mallya, A. et al., "PackNet: Adding Multiple Tasks to a Single Network by Iterative Pruning," 2018 IEEE Conference on Computer Vision and Pattern Recognition, CVPR 2018, Salt Lake City, Utah, Jun. 18, 2018, 9 pages.

Molino, A. et al., "PHD-GIFs: Personalized Highlight Detection for Automatic GIF Creation," Proceedings of the 26th ACM international conference on Multimedia, Oct. 22, 2018, Seoul, Republic of Korea, 9 pages.

Potapov, D. et al., "Category-specific video summarization," Computer Vision—ECCV 2014—13th European Conference, Zurich, Switzerland, Sep. 6, 2014, 17 pages.

Rebuffi, S, et al., "iCaRL: Incremental Classifier and Representation Learning," 2017 IEEE Conference on Computer Vision and Pattern Recognition, CVPR 2017, Honolulu, Hawaii, Jul. 21, 2017, 15 pages.

Rodriguez-Opazo, C. et al., "Proposal-free Temporal Moment Localization of a Natural-Language Query in Video using Guided Attention," Proceedings of the IEEE/CVF Winter Conference on Applications of Computer Vision (WACV), Snowmass village, Colorado, Mar. 2, 2020, 10 pages.

Rolnick, D. et al., "Experience Replay for Continual Learning," Advances in Neural Information Processing Systems 32: Annual Conference on Neural Information Processing Systems 2019, NeurIPS 2019, Dec. 8, 2019, Vancouver, BC, Canada, 14 pages.

Rosenfeld, A. et al., "Incremental Learning Through Deep Adaptation," IEEE Trans. Pattern Anal. Mach. Intell., vol. 42, No. 3, Nov. 30, 2018, 13 pages.

(56) References Cited

OTHER PUBLICATIONS

Russakovsky, O. et al., "ImageNet Large Scale Visual Recognition Challenge," International Journal of Computer Vision (IJCV), vol. 115, No. 3, Dec. 2015, 43 pages.

Saquil, Y. et al., "Multiple Pairwise Ranking Networks for Personalized Video Summarization," Proceedings of the IEEE/CVF International Conference on Computer Vision (ICCV), Oct. 10, 2021, Montreal, QC, Canada, 10 pages.

Schwarz, J. et al., "Progress & Compress: A scalable framework for continual learning," ArXiv, May 16, 2018, 13 pages.

Song, Y. et al., "TVSum: SummarizingWeb Videos Using Titles," IEEE Conference on Computer Vision and Pattern Recognition, CVPR 2015, Boston, Massachusetts, Jun. 7, 2015, 9 pages.

Sun, M. et al., "Ranking Domain-specific Highlights by Analyzing Edited Videos," Computer Vision—ECCV 2014—13th European Conference, Zurich, Switzerland, Sep. 6, 2014, 16 pages.

Van der Maaten, L. et al., "Visualizing Data using t-SNE," Journal of Machine Learning Research, vol. 9, 2008, 27 pages.

Xiong, B. et al., "Less is More: Learning Highlight Detection from Video Duration," Proceedings of the IEEE/CVF Conference on Computer Vision and Pattern Recognition (CVPR), Jun. 15, 2019, Long Beach, California, 14 pages.

Yan, S. et al., "DER: Dynamically Expandable Representation for Class Incremental Learning," Proceedings of the IEEE/CVF Conference on Computer Vision and Pattern Recognition (CVPR), Jun. 19, 2021, Virtual, 12 pages.

Yang, H. et al., "Unsupervised Extraction of Video Highlights Via Robust Recurrent Auto-encoders," 2015 IEEE International Conference on Computer Vision, ICCV 2015, Dec. 7, 2015, Santiago, Chile, 9 pages.

Yao, T. et al., "Highlight Detection with Pairwise Deep Ranking for First-Person Video Summarization," 2016 IEEE Conference on Computer Vision and Pattern Recognition, CVPR 2016, Jun. 27, 2016, Las Vegas, Nevada, 9 pages.

Zenke, F. et al., "Continual Learning Through Synaptic Intelligence," Proceedings of the 34th International Conference on Machine Learning, ICML 2017, Aug. 6, 2017, Sydney, NSW, Australia, 9 pages.

Zhang, K. et al., "Retrospective Encoders for Video Summarization," Computer Vision—ECCV 2018—15th European Conference, Sep. 8, 2018, Munich, Germany, 17 pages.

Zhang, S. et al., "Learning 2D Temporal Adjacent Networks for Moment Localization with Natural Language," Proceedings of the AAAI Conference on Artificial Intelligence, Feb. 7, 2020, New York, New York, 9 pages.

Zhu, W. et al., "DSNet: A Flexible Detect-to-Summarize Network for Video Summarization," IEEE Transactions on , Image Processing, vol. 30, 2021, 19 pages.

\* cited by examiner

INFERENCE STAGE

TRAINING STAGE

| $k$ | mAP ($\gamma = 5.0$) | | | | |
|---|---|---|---|---|---|
| | $\mathcal{T}_1$ | $\mathcal{T}_2$ | $\mathcal{T}_3$ | $\mathcal{T}_4$ | Avg. |
| 10 | 35.31 | 33.48 | 29.18 | 25.98 | 30.99 |
| 20 | 35.82 | 34.66 | 30.72 | 28.73 | 32.35 |
| 30 | 36.13 | 35.70 | 30.51 | 28.67 | 32.75 |
| 40 | 36.14 | 35.82 | 31.87 | 29.88 | 33.43 |
| 50 | 36.21 | 35.88 | 31.90 | 29.94 | 33.48 |

FIG. 8

| $\gamma$ | mAP ($k = 40$) | | | | |
|---|---|---|---|---|---|
| | $\mathcal{T}_1$ | $\mathcal{T}_2$ | $\mathcal{T}_3$ | $\mathcal{T}_4$ | Avg. |
| 1e-3 | 36.14 | 34.26 | 30.17 | 26.43 | 31.75 |
| 1.0 | 36.13 | 34.97 | 30.62 | 27.41 | 32.28 |
| 3.0 | 36.15 | 35.50 | 31.44 | 28.27 | 32.84 |
| 5.0 | 36.14 | 35.82 | 31.87 | 29.88 | 33.43 |
| 15.0 | 36.14 | 34.92 | 30.80 | 28.12 | 32.50 |

FIG. 9

INCREMENTAL VIDEO HIGHLIGHTS DETECTION SYSTEM AND METHOD

BACKGROUND

Video highlights detection (VHD) is an active research field in computer vision, aiming to locate the most user-appealing clips given raw video inputs. However, most VHD methods are based on a closed world assumption, i.e., on an assumption that a fixed number of highlight categories can be defined in advance and all training data needed to train a model to label video frames as belonging to the highlight categories is available beforehand. When a model is trained based on a closed world assumption and later the number of highlight categories is expanded, a prior approach would retrain the model for the larger number of categories using all collected videos. One drawback with this approach is that it requires a large amount of compute time, which is very costly and energy intensive. Another drawback is that the retrained model may be less accurate with regard to the original highlight categories after it is retrained. Consequently, this prior approach has poor scalability with respect to increasing highlight category domains and training data.

SUMMARY

In view of the above, a computing system for incremental video highlights detection is provided. The computing system includes memory and a processor being configured to execute a program using portions of the memory to receive an input video, sample video frames from the input video, extract frame-wise spatial features from the video frames using a convolutional neural network, extract a frame-wise temporal feature for each video frame, aggregate the frame-wise spatial features and the frame-wise temporal feature for each video frame to provide a temporal context to the frame-wise spatial features, input the aggregated frame-wise spatial features and the frame-wise temporal feature for each frame into a transformer encoder to obtain temporal-aware feature representations of the video frames, input the feature representations into a feedforward network model to obtain feedforward-transformed features, obtain a parameter by inputting each feedforward-transformed feature and a set of highlight prototypes into a function comparing the feedforward-transformed features to the set of highlight prototypes, classify the video frames as highlights based on the parameter calculated using the function comparing the feedforward-transformed features to the set of highlight prototypes, and output the classification of the video frames. The convolutional neural network, the transformer encoder, and the feedforward network model are incrementally trained so that the highlight prototypes are trained from weights learned in previous training stages.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8 is a table from an ablation study demonstrating the effects on video frame classification performance of changing the number of prototypes in the set of highlight prototypes in the incremental video highlights detection module of FIGS. 1 and 2.

FIG. 9 is a table from an ablation study demonstrating the effects on video frame classification performance of changing the tolerable change introduced to the highlight prototypes in the incremental video highlights detection module of FIGS. 1 and 2.

DETAILED DESCRIPTION

The popularization of portable devices with cameras has greatly promoted the creation and broadcasting of online videos, which has increased demand for tasks including video summarization, video highlights detection (VHD), and moment localization. Currently, most VHD methods are developed under the closed world assumption, which requires both the number of highlight domains and the size of training data to be fixed in advance. However, this closed world assumption is not practical in real world applications, in which the number of highlight domains may change over time, and new data may be constantly incorporated from different domains or categories.

Current VHD methods have drawbacks which prevent them from being implemented in certain applications. For example, many current methods are unable to predict both old and newly added domains, unless the models are retrained on the complete dataset, and even then prediction accuracy of the model may be degraded for the old domains. Such limitations greatly add to training costs, and also force developers to make trade-offs regarding maintaining high accuracy vs. retraining to add new highlight domains. In view of these observations, the present disclosure describes various methods and systems for incremental video highlights detection capable of addressing the aforementioned issues. Such methods and systems are described below in further detail.

Figure 1:
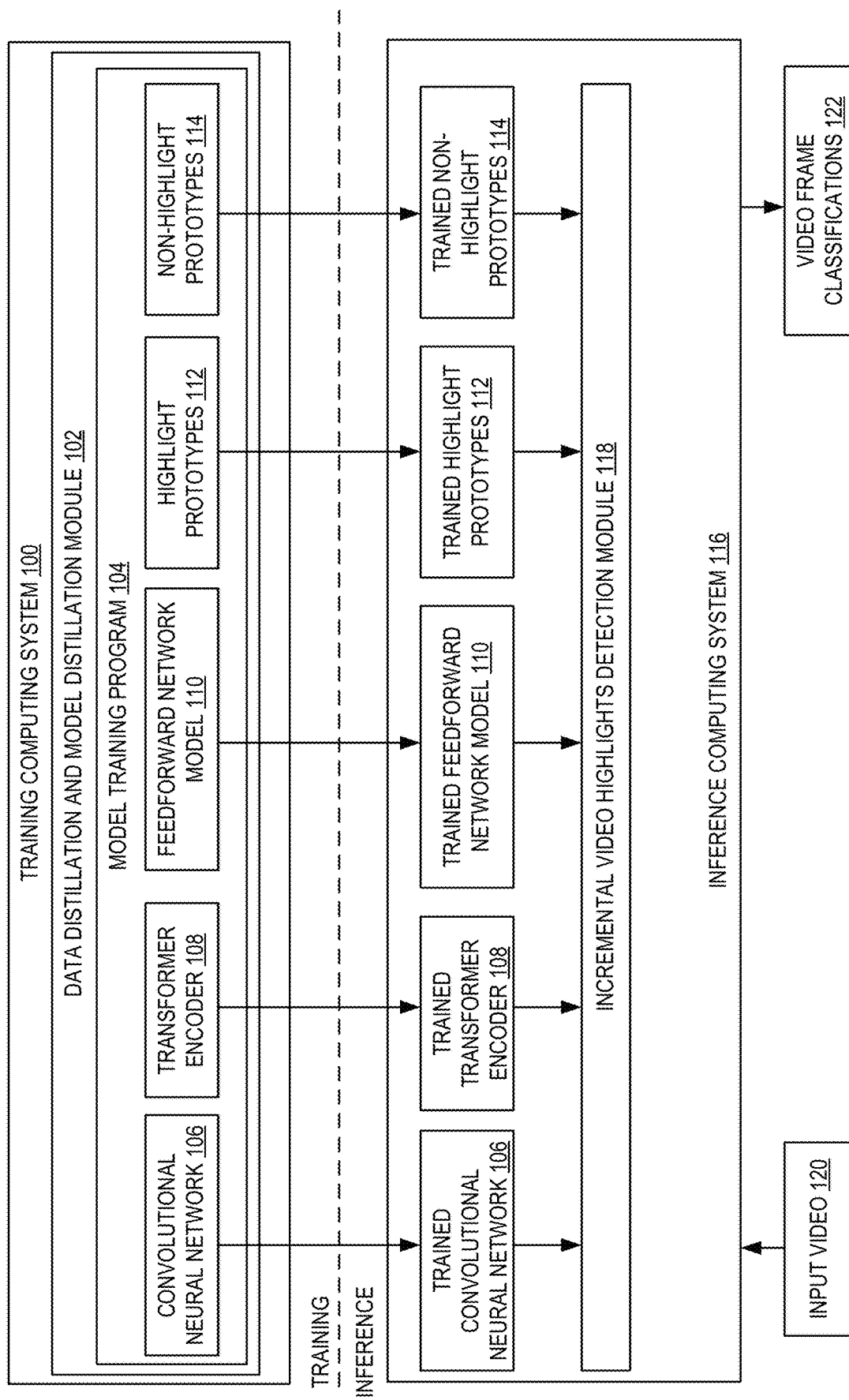
FIG. 1 illustrates a schematic view of a training computing system and an inference computing system according to an example of the present disclosure.

Referring to FIG. 1, a process of classifying video frames of an input video using an incremental video highlights detection process is schematically depicted from the training steps to the inference steps. Initially, a training computing system 100 executes a data distillation and model distillation module 102, which includes a model trainer 104 configured to train a convolutional neural network 106, a transformer encoder 108, a feedforward network model 110, a set of highlight prototypes 112, and a set of non-highlight prototypes 114 using training data. The convolutional neural network 106, the transformer encoder 108, the feedforward network model 110, the set of highlight prototypes 112, and the set of non-highlight prototypes 114 trained by the model trainer 104 are then installed on an inference computing system 116 and used by an incremental video highlights detection module 118 to receive and process an input video 120 to generate video frame classifications 122 corresponding to the input video 120, as explained in further detail below.

Figure 2:
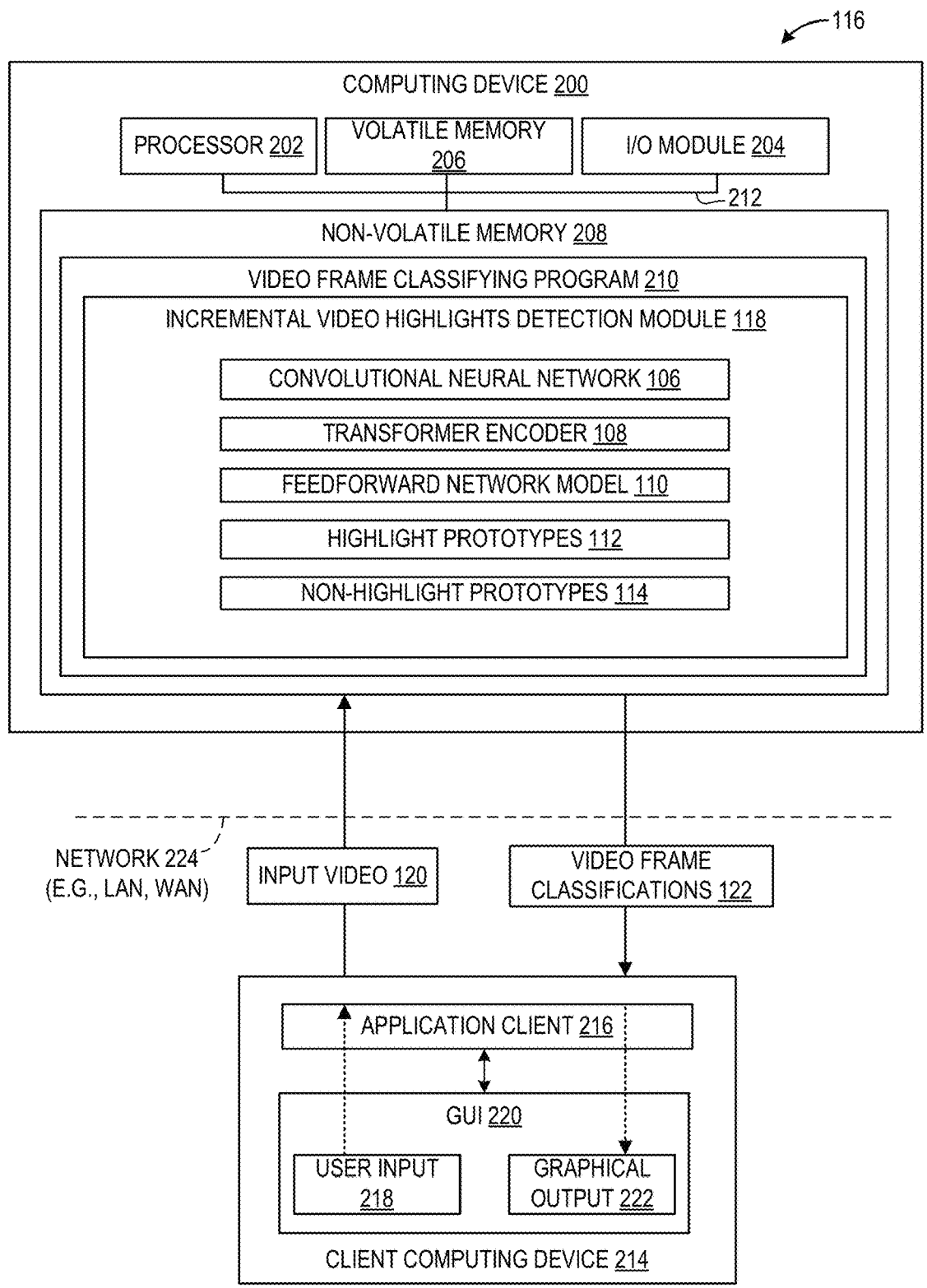
FIG. 2 illustrates a detailed schematic view of the inference computing system of FIG. 1.

Referring to FIG. 2, an inference computing system 116 for classifying video frames of an input video 120 using an incremental video highlights detection process is provided. The inference computing system 116 comprises a computing device 200 including a processor 202, an input/output module 204, volatile memory 206, and non-volatile memory 208 storing an video frame classifying program 210 comprising the convolutional neural network 106, the transformer encoder 108, the feedforward network model 110, the set of highlight prototypes 112, and the set of non-highlight prototypes 114. A bus 212 may operatively couple the processor 202, the input/output module 204, and the volatile memory 206 to the non-volatile memory 208. The inference computing system 116 is operatively coupled to a client computing system 214 via a network 224. In some examples, the network 224 may take the form of a local area network (LAN), wide area network (WAN), wired network, wireless network, personal area network, or a combination thereof, and can include the Internet. Although the video frame classifying program 210 is depicted as hosted at one computing device 200, it will be appreciated that the video frame classifying program 210 may alternatively be hosted across a plurality of computing devices to which the computing device 200 may be communicatively coupled via a network, including network 224.

The processor 202 is configured to store the video frame classifying program 210 in non-volatile memory 208 that retains instructions stored data even in the absence of externally applied power, such as FLASH memory, a hard disk, read only memory (ROM), electrically erasable programmable memory (EEPROM), etc. The instructions include one or more programs, including the video frame classifying program 210, and data used by such programs sufficient to perform the operations described herein. In response to execution by the processor 202, the instructions cause the processor 202 to execute the video frame classifying program 210, which includes the convolutional neural network 106, the transformer encoder 108, the feedforward network model 110, the set of highlight prototypes 112, and the set of non-highlight prototypes 114.

The processor 202 is a microprocessor that includes one or more of a central processing unit (CPU), a graphical processing unit (GPU), an application specific integrated circuit (ASIC), a system on chip (SOC), a field-programmable gate array (FPGA), a logic circuit, or other suitable type of microprocessor configured to perform the functions recited herein. Volatile memory 206 can include physical devices such as random access memory (RAM), static random access memory (SRAM), dynamic random access memory (DRAM), etc., which temporarily stores data only for so long as power is applied during execution of programs. Non-volatile memory 208 can include physical devices that are removable and/or built in, such as optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology.

In one example, a user operating the client computing device 214 may send an input video 120 to the computing device 200. The processor 202 of the computing device 200 is configured to receive the input video 120 from the user and execute the video frame classifying program 210 to generate video frame classifications 122 which correspond to the input video 120. The processor 202 then returns the video frame classifications 122 to the client computing device 214.

The client computing device 214 may execute an application client 216 to send the input video 120 to the computing device 200 upon detecting a user input 218 and subsequently receive the video frame classifications 122 from the computing device 200. The application client 216 may be coupled to a graphical user interface 220 of the client computing device 214 to display a graphical output 222 of the video frame classifications 122.

Although not depicted here, it will be appreciated that the training computing system 100 that executes the data distillation and model distillation module 102 of FIG. 1 can be configured similarly to computing device 200.

Figure 3:
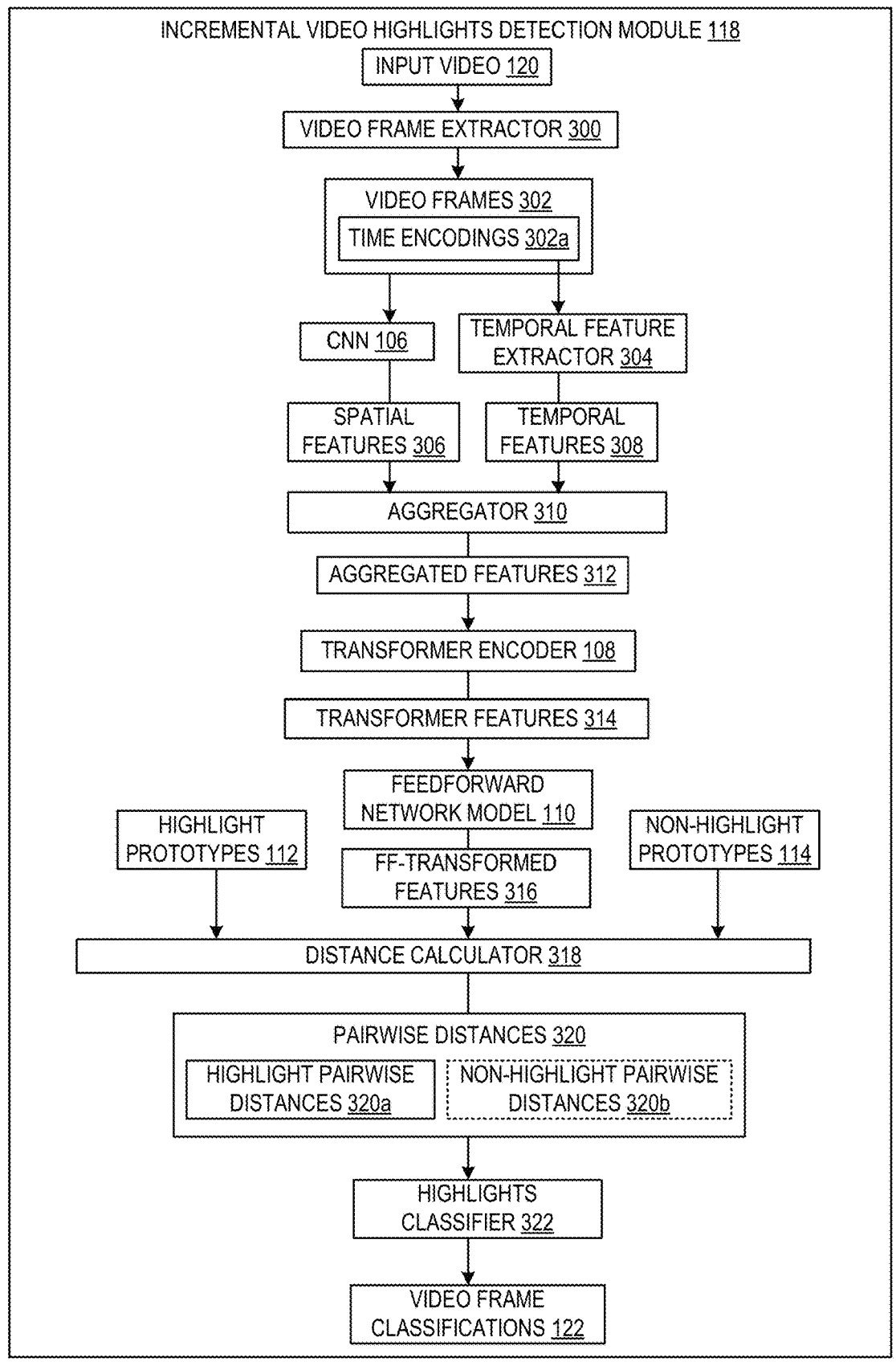
FIG. 3 illustrates a detailed schematic view of the video frame classifying program of the inference computing system of FIG. 1.

Referring to FIG. 3, operations of the incremental video highlights detection module 118 of FIGS. 1 and 2 are described in detail. An input video 120 is received. A video frame extractor 300 extracts video frames 302, including time encodings 302a of the video frames 302, from the input video 120. Frame-wise spatial features 306 are extracted from the video frames 302 using a convolutional neural network 106. A temporal feature extractor 304 extracts a frame-wise temporal feature 308 for each video frame 302 based on the time encodings 302a. The frame-wise spatial features 306 and the frame-wise temporal feature 308 are aggregated by an aggregator 310 for each video frame to provide a temporal context to the frame-wise spatial features 306. The aggregated features 312, including the frame-wise spatial features 306 and the frame-wise temporal features 308, are inputted into a transformer encoder 108 to obtain temporal-aware feature representations, or transformer features 314 of the video frames 302. The transformer encoder 108 may have eight heads and three layers, for example.

The transformer features 314 are inputted into a feedforward network model 110, which may be configured as a multi-layer perception with fully-connected layers and three linear layers activated by a rectified linear unit (ReLU), for example, to obtain feedforward-transformed features 316. Then a parameter 320 is obtained by inputting each feedforward-transformed feature 316 and a set of highlight prototypes 112 into a function 318 comparing the feedforward-transformed features 316 to the set of highlight prototypes 112. When the function 318 is configured as a distance calculator, the feedforward-transformed features 316, the set of highlight prototypes 112, and the set of non-highlight prototypes 114 are inputted into the distance calculator 318, which calculates a distance between each feedforward-transformed feature 316 and the set of highlight prototypes 112 to obtain highlight pair-wise distances 320a between the feedforward-transformed features 316 and the set of highlight prototypes 112. The distance calculator 318 may also calculate a distance between each feedforward-transformed feature 316 and the set of non-highlight prototypes 114 to obtain non-highlight pair-wise distances 320b between the feedforward-transformed features 316 and the set of non-highlight prototypes 114. The highlight prototypes 112 and non-highlight prototypes 114 may be formulated as 40 vectors with dimensions of 128.

The distance calculator 318 may calculate the distance between each feedforward-transformed feature 316 and the set of highlight prototypes 112 using the following formula:

$$d(l, \pi) = \frac{1}{k}\sum_{i=1}^{k}\sqrt{\sum_{j=1}^{m}(l_{i,j} - \pi_{i,j})^2}.$$

Here, l represents the feature representation and π represents the set of highlight prototypes.

A highlight classifier 322 generates video frames classifications 122 classifying the video frames 302 as highlights based on the parameter 320 which was calculated using the function 318 comparing the feedforward-transformed features 316 to the set of highlight prototypes 112. When the function 318 is configured as a distance calculator, the highlight classifier 322 may generate video frames classifications 122 classifying the video frames 302 as highlights based on the pair-wise distances 320 including the highlight pairwise distances 320a and the non-highlight pairwise distances 320b. For example, when the highlight pairwise distances 320a are greater than the non-highlight pairwise distances 320b for a given feedforward-transformed feature 316, then the video frame may be classified as a highlight. Otherwise, when the non-highlight pairwise distances 320b are greater than the highlight pairwise distances 320a for a given feedforward-transformed feature 316, then the video frame may be classified as a non-highlight.

Figure 4:
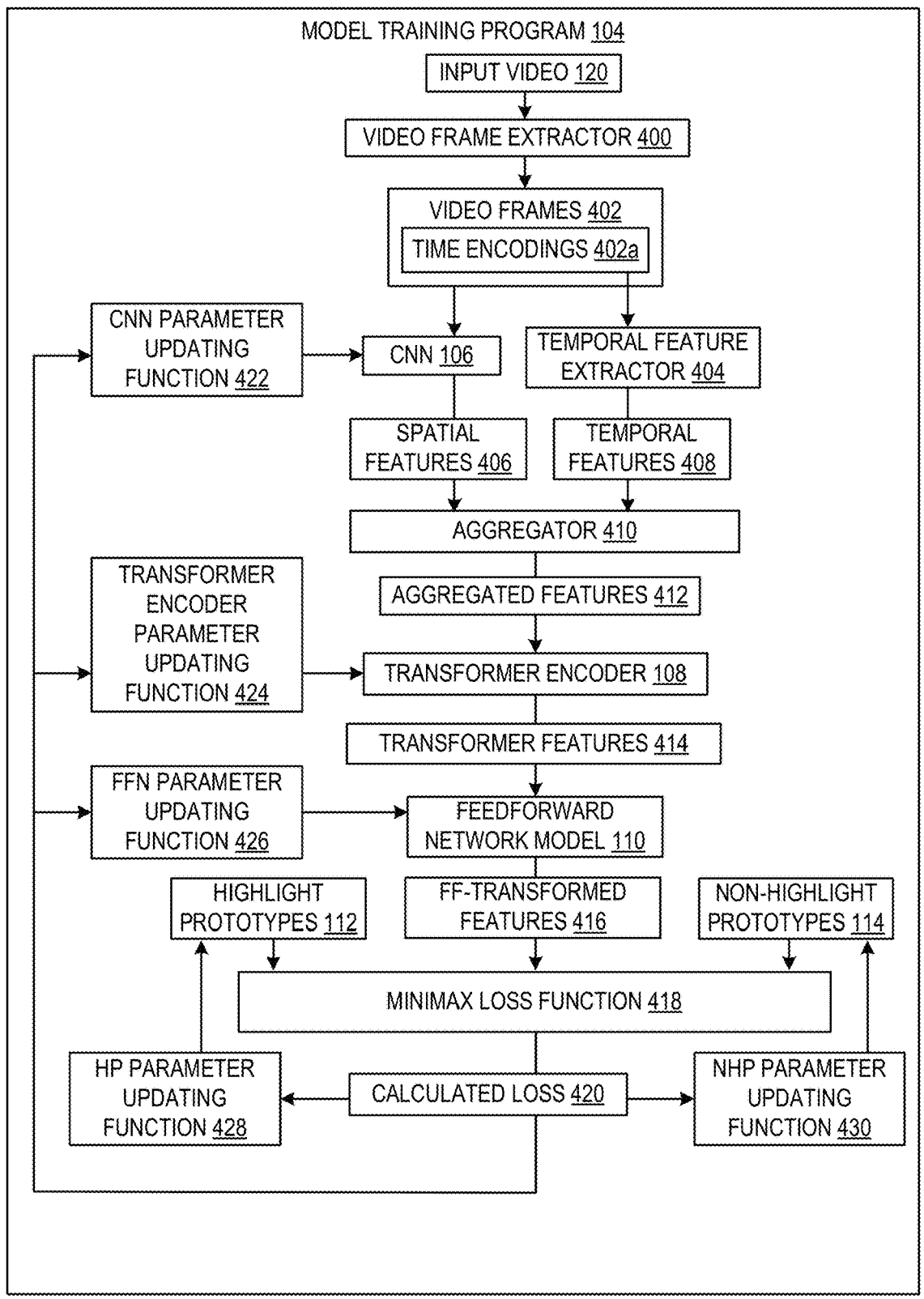
FIG. 4 illustrates a detailed schematic view of the model training program of the training computing system of FIG. 1.

Referring to FIG. 4, operations of the data distillation and model distillation module 102 and model training program 104 of FIG. 1 are described in detail. Since the features of the model training program 104 are similar to the incremental video highlights detection module 118, including the video extractor 400, the convolutional neural network 106, the temporal feature extractor 404, the aggregator 410, the transformer encoder 108, and the feedforward network model 110, the detailed description thereof is abbreviated here. Like parts in this example are numbered similarly to the incremental video highlights detection module 118 and share their functions, and will not be described again except as below for the sake of brevity.

The feedforward-transformed features 416, the set of highlight prototypes 112, and the set of non-highlight prototypes 114 are inputted into a minimax loss function 418, which calculates a calculated loss 420. The calculated loss 420 may be a cross-entropy loss used to optimize the feedforward network model 110 through gradient back propagation, which may be performed through the following formula:

$$\mathcal{L}_{cls} = -\frac{1}{N}\sum_{i=1}^{N} y_i \cdot \log(P_H) + (1 - y_i) \cdot \log(1 - P_H).$$

Here, $\mathcal{L}_{cls}$ represents the cross-entropy loss, N represents the size of training video frames, $y_i$ equals 1 if the i-th video frame is classified as highlights, $y_i$ equals 0 if the i-th video frame is classified as non-highlights, and $P_H$ is a probability expressing a confidence of classifying the i-th video frame as highlights.

The probability $P_H$ may be expressed as the following formulas:

$$P_H = \frac{\exp(-d_H)}{\exp(-d_H) + \exp(-d_V)};$$
$$d_H = \min_{i=1:k} d(g_\phi(h), H_i); \text{ and}$$
$$d_V = \min_{i=1:k} d(g_\phi(h), V_i).$$

Here, h represents the feature representations 414, $g_\phi(h)$ represents the feedforward-transformed features 416, $H_i$ is a highlight prototype 112, $d(g_\phi(h), H_i)$ is a distance between the feedforward-transformed features 416 and the highlight prototype 112, $V_i$ is a non-highlight prototype 114, and $d(g_\phi(h), V_i)$ is a distance between the feedforward-transformed features 416 and the non-highlight prototype 114.

The minimax loss function 418 may include a product of an empirical Lagrangian variable and a difference between a set of highlight prototypes 112 in a current training stage and a set of highlight prototypes 112 in a previous training state, and a difference between a set of non-highlight prototypes 114 in the current training stage and a set of non-highlight prototypes 114 in the previous training state. the minimax loss function 418 is expressed as the following formulas:

$$S^T = (\theta^{(T)}, \phi^{(T)}, \pi^{(T)});$$
$$S^{(T)} = \max_\lambda \min_{\theta,\phi,\pi} L(\theta, \phi, \pi, \lambda);$$
$$S^{(T)} = \max_\lambda \min_{\theta,\phi,\pi} \mathcal{L}_{cls}(\theta, \phi, \pi) + \lambda[d(\pi^{(T-1)}, \pi^T) - \gamma]; \text{ and}$$
$$d(\pi^{(T-1)}, \pi^T) = \frac{1}{k}\sum_{i=1}^{k}\sqrt{\sum_{j=1}^{m}(\pi_{i,j}^{(T-1)} - \pi_{i,j}^{(T)})^2}.$$

Here, $S^{(T)}$ represents an optimal solution in training stage T which is a calculated loss 420, θ represents the parameters of the convolutional neural network 106 and the parameters of the transformer encoder 108, φ represents the parameters of the feedforward network model 110, λ represents the empirical Lagrangian variable, T represents the current training stage, T-1 represents the previous training stage previous to the current training stage, π represents the set of highlight prototypes 112 and the set of non-highlight prototypes 114; and $d(\pi^{(T-1)}, \pi^T)$ represents a distance between the set of highlight prototypes 112 in the current training stage and the set of highlight prototypes 112 in the previous training stage, and a distance between the set of non-highlight prototypes 114 in the current training stage and the set of non-highlight prototypes 114 in the previous training stage.

The convolutional neural network parameter updating function 422 uses the calculated loss 420 to update the trainable parameters of the convolutional neural network 106. The transformer encoder parameter updating function 424 uses the calculated loss 420 to update the trainable parameters of the transformer encoder 108. The feedforward network updating function 426 uses the calculated loss 420 to update the trainable parameters of the feedforward network model 110. The highlight parameter updating function 428 and the non-highlight parameter updating function 430 use the calculated loss 420 to update the trainable parameters of the highlight prototypes 112 and the non-highlight prototypes 114, respectively.

The convolutional neural network parameter updating function 422 and the transformer encoder parameter updating function 424 may include the following formula:

$$\theta \leftarrow \theta - \eta \frac{\partial \mathcal{L}_{cls}(\theta, \phi, \pi)}{\partial \theta}.$$

The feedforward network updating function 426 may include the following formula:

$$\phi \leftarrow \phi - \eta \frac{\partial \mathcal{L}_{cls}(\theta, \phi, \pi)}{\partial \phi}.$$

The highlight parameter updating function 428 and the non-highlight parameter updating function 430 may include the following formulas:

$$\pi \leftarrow \pi - \eta \frac{\partial \mathcal{L}_{cls}(\theta, \phi, \pi)}{\partial \theta}; \text{ and } \lambda \leftarrow \max\{\lambda + \eta[d(\pi^{(T-1)}, \pi^T) - \gamma], 0\}.$$

Here, θ represents the parameters of the convolutional neural network 106 and the parameters of the transformer encoder 108, ϕ represents the parameters of the feedforward network model 110, λ represents the empirical Lagrangian variable, T-1 represents the previous training stage previous to the current training stage T, π represents the set of highlight prototypes 112 and the set of non-highlight prototypes 114, and γ represents a tolerable change introduced to the set of highlight prototypes 112 and the set of non-highlight prototypes 114.

Then the process of calculating the loss and parameters for the models and prototypes is repeated for every stage, so that all prototypes learned in previous stages may be inherited and trained. Thus, the convolutional neural network 106, the transformer encoder 108, and the feedforward network model 110 are incrementally trained so that the highlight prototypes 112 are trained from weights learned in previous training stages.

Although FIGS. 1-4 depict the convolutional neural network 106, the transformer encoder 108, the feedforward network model 110, the set of highlight prototypes 112, and the set of non-highlight prototypes 114 as separate modules, different combinations of these modules can be implemented within a single video highlight detection process.

Figure 5:
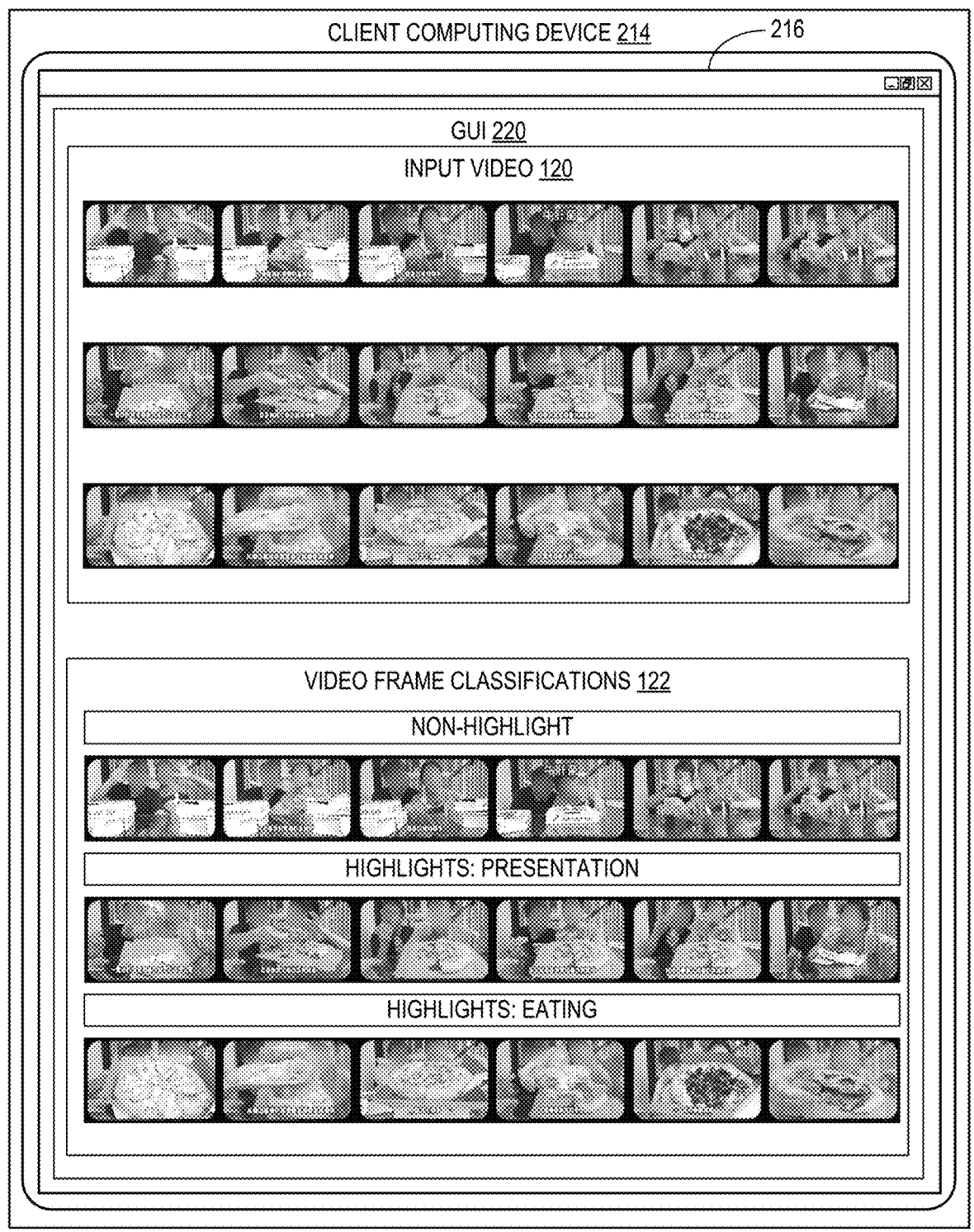
FIG. 5 is an example illustration of an application client showing input video and a classification of the video frames of the input video, as performed by the inference computing system of FIG. 1.

Referring to FIG. 5, a schematic view is shown of an application client 216 for a video rendering program, which can be implemented on a client computing device 214 such as the one shown in FIG. 2. The application client 216 receives input containing an input video 120 through a graphical user interface 220. In response, the application client 216 generates and outputs video frame classifications 122 corresponding to the input video 120 on the graphical user interface 220. In this example, the input video 120 is a gourmet cooking video, and the video frame classifications 122 correspond the input video 120. In this example, the video frames are divided into two classifications: highlights and non-highlights. The highlights include such categories as cooking, presentation, and eating.

Figure 6:
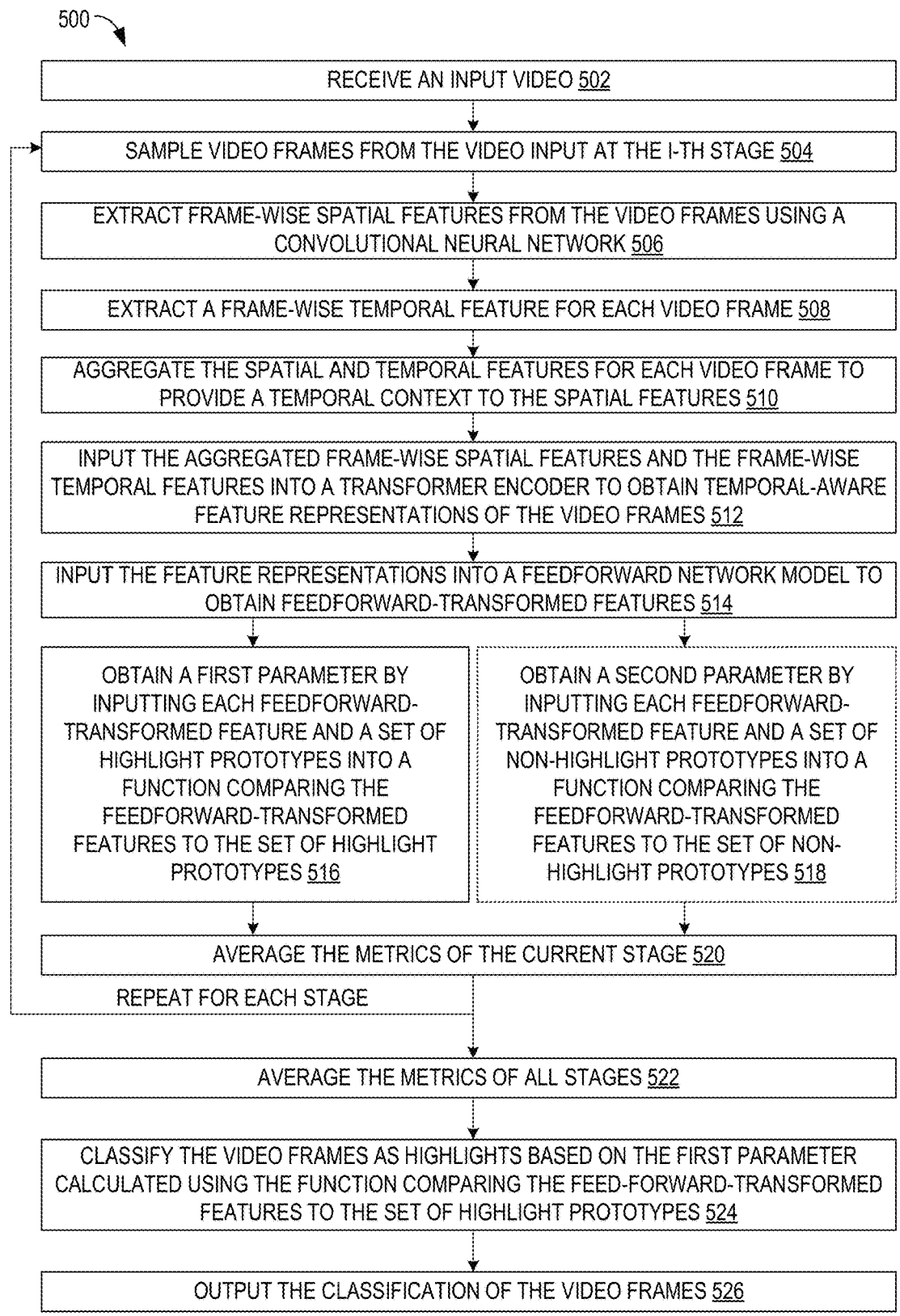
FIG. 6 is a flowchart of a method for classifying video frames of an input video using an incremental video highlights detection process according to an example embodiment of the present disclosure.

FIG. 6 illustrates a flowchart of a computerized method 500 for classifying video frames of an input video using an incremental video highlights detection process. The following description of computerized method 500 is provided with reference to the software and hardware components described above and shown in FIGS. 1 to 5. It will be appreciated that computerized method 500 also may be performed in other contexts using other suitable hardware and software components.

At step 502, an input video is received from a user. At step 504, video frames are sampled from the input video at the i-th stage. At step 506, frame-wise spatial features are extracted from the video frames using a convolutional neural network. At step 508, a frame-wise temporal feature is extracted for each video frame. At step 510, the frame-wise spatial features and the frame-wise temporal feature are aggregated for each video frame to provide a temporal context to the frame-wise spatial features. At step 512, the aggregated frame-wise spatial features and the frame-wise temporal feature for each video frame are inputted into a transformer encoder to obtain temporal-aware feature representations of the video frames. At step 514, the feature representations are inputted into a feedforward network model to obtain feedforward-transformed features.

At step 516, a first parameter is obtained by inputting each feedforward-transformed feature and a set of highlight prototypes into a function comparing the feedforward-transformed features to the set of highlight prototypes. The feedforward-transformed features and the set of highlight prototypes may be inputted into a distance calculator, which calculates a distance between each feedforward-transformed feature and the set of highlight prototypes to obtain highlight pair-wise distances between the feedforward-transformed features and the set of highlight prototypes as the first parameter.

At step 518, a second parameter may be obtained by inputting each feedforward-transformed feature and a set of non-highlight prototypes into a function comparing the feedforward-transformed features to the set of non-highlight prototypes. The feedforward-transformed features and the set of non-highlight prototypes may be inputted into a distance calculator, which calculates a distance between each feedforward-transformed feature and the set of non-highlight prototypes to obtain non-highlight pair-wise distances between the feedforward-transformed features and the set of non-highlight prototypes as the second parameter.

At step 520, the metrics of the current i-th stage are averaged. The metrics include the first parameter, and may also include the second parameter. At step 522, after steps 504 to 520 are repeated for each stage, the metrics of all the stages are averaged. At step 524, the video frames are classified as highlights based on the first parameter calculated using the function comparing the feedforward-transformed features to the set of highlight prototypes. The video frames may also be classified as non-highlights based on the second parameter calculated using the function comparing the feedforward-transformed features to the set of non-highlight prototypes. At step 526, the classification of the video frames is outputted.

Figure 7:
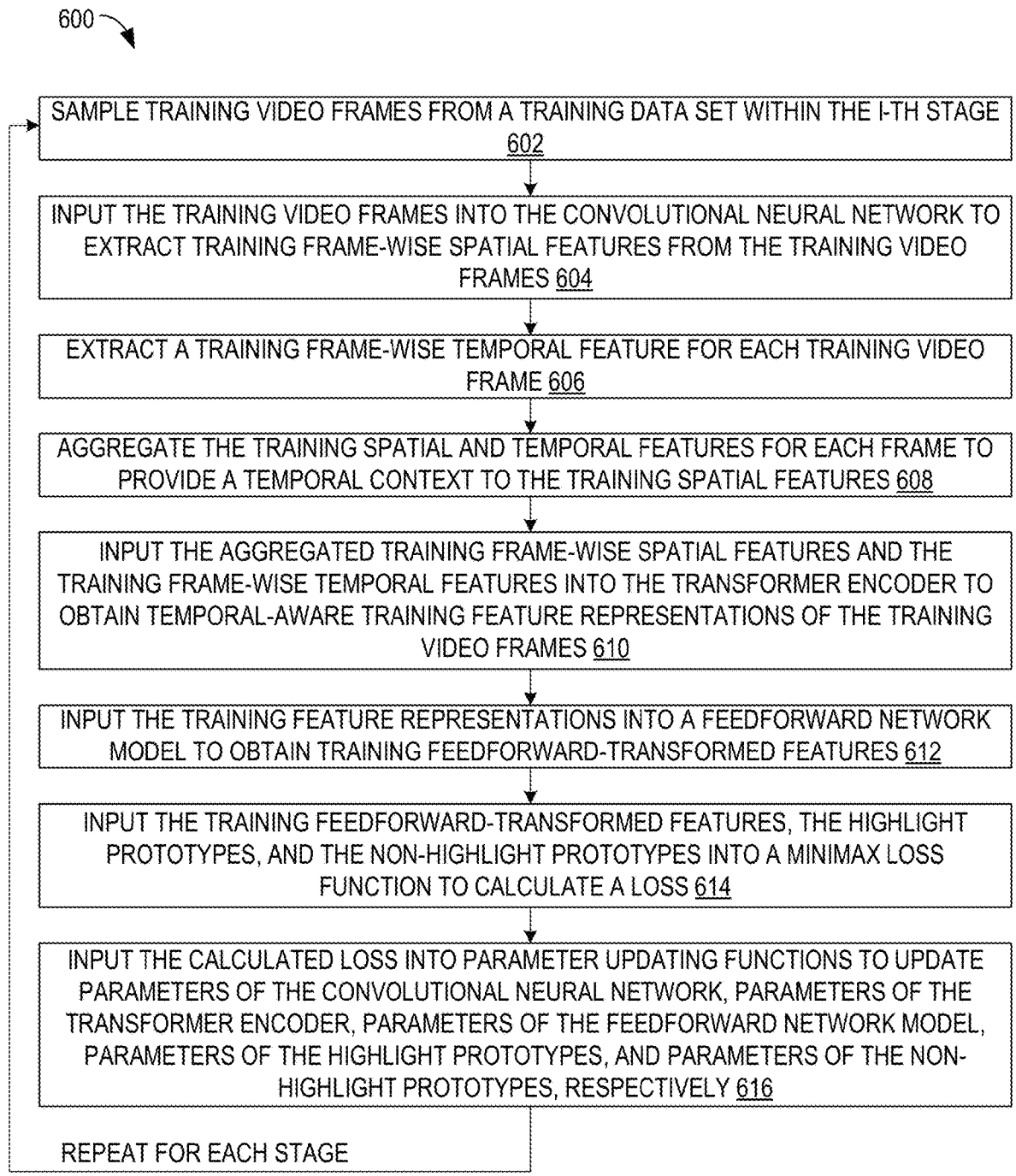
FIG. 7 is a flowchart of a method for training models and prototypes of the incremental video highlights detection module using data and model distillation according to an example embodiment of the present disclosure.

FIG. 7 illustrates a flowchart of a computerized method 600 for training train a convolutional neural network, transformer encoder, feedforward network model, highlight prototypes, and non-highlight prototypes using data and model distillation. The following description of computerized method 600 is provided with reference to the software and hardware components described above and shown in FIGS. 1 to 7. It will be appreciated that computerized method 600 also may be performed in other contexts using other suitable hardware and software components.

At step 602, training video frames are sampled from a training data set within the i-th stage. At step 604, the training video frames are inputted into the convolutional neural network, and training frame-wise spatial features are extracted from the training video frames using the convolutional neural network. At step 606, a training frame-wise temporal feature is extracted for each training video frame. At step 608, the training frame-wise spatial features and the training frame-wise temporal feature are aggregated for each training video frame to provide a temporal context to the training frame-wise spatial features. At step 610, the aggregated training frame-wise spatial features and the training frame-wise temporal feature for each training video frame are inputted into a transformer encoder to obtain temporal-aware training feature representations of the video frames. At step 612, the training feature representations are inputted into a feedforward network model to obtain training feedforward-transformed features. At step 614, the training feedforward-transformed features, the highlight prototypes, and the non-highlight prototypes are inputted into a minimax loss function to calculate a loss. At step 616, the calculated loss is inputted into parameter updating functions to update parameters of the convolutional neural network, parameters of the transformer encoder, parameters of the feedforward network, parameters of the highlight prototypes, and parameters of the non-highlight prototypes, respectively. Steps 602 through 616 are subsequently repeated for each stage.

FIG. 8 is a table from an ablation study demonstrating the effects on video frame classification performance of changing the number of prototypes in the set of highlight prototypes in the incremental video highlights detection module of FIGS. 1 and 2. The incremental video highlights detection module was trained on training video frame data streams T1, T2, T3, and T4 using sets of k=10, k=20, k=30, k=40, and k=50 highlight prototypes, where k represents the number of prototypes in the set of highlight prototypes. The tolerable change γ introduced to the highlight prototypes was 5.0. The video frame classification performance of the trained incremental video highlights detection module was measured using mAP (mean Average Precision), a metric commonly used to measure the accuracy of object detection. It was observed that the performance of the module over all tasks consistently increased with the increase of the number of prototypes in the set of highlight prototypes. However, it was noted that the performance gain between k=40 and k=50 was marginal. Therefore, the present inventors concluded that setting the number of prototypes in the set of highlight prototypes to k=40 achieved a good balance between accuracy and efficiency.

FIG. 9 is a table from an ablation study demonstrating the effects on video frame classification performance of changing the tolerable change γ introduced to the highlight prototypes in the incremental video highlights detection module of FIGS. 1 and 2. The incremental video highlights detection module was trained on training video frame data streams T1, T2, T3, and T4 using a set of k=40 highlight prototypes at γ=$10^{-3}$, γ=1.0, γ=3.0, γ=5.0, and γ=15.0. The video frame classification performance of the trained incremental video highlights detection module was measured using mAP. It was observed that performance was lowest at relatively small γ values, while increasing the γ value steadily increased performance. However, increasing the γ value to 15.0 also led to drops in performance, presumably due to catastrophic forgetting, which is a common problem encountered in incremental learning characterized by the forgetting of old classes or domains when learning new concepts. Therefore, the present inventors concluded that setting γ=5 achieves increased performance while minimizing catastrophic forgetting.

The above-described system and methods use an effective scheme to introduce incremental settings to video highlights detection tasks, so that models used for video highlights detection may learn incrementally with increasing datasets and domains without encountering issues with catastrophic forgetting. The incremental settings eliminate the need to retrain the system using all collected videos at different stages whenever the number of highlight categories is expanded, since the essential features can be captured within each domain. Accordingly, excellent scalability and a reduction in training costs can be achieved.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
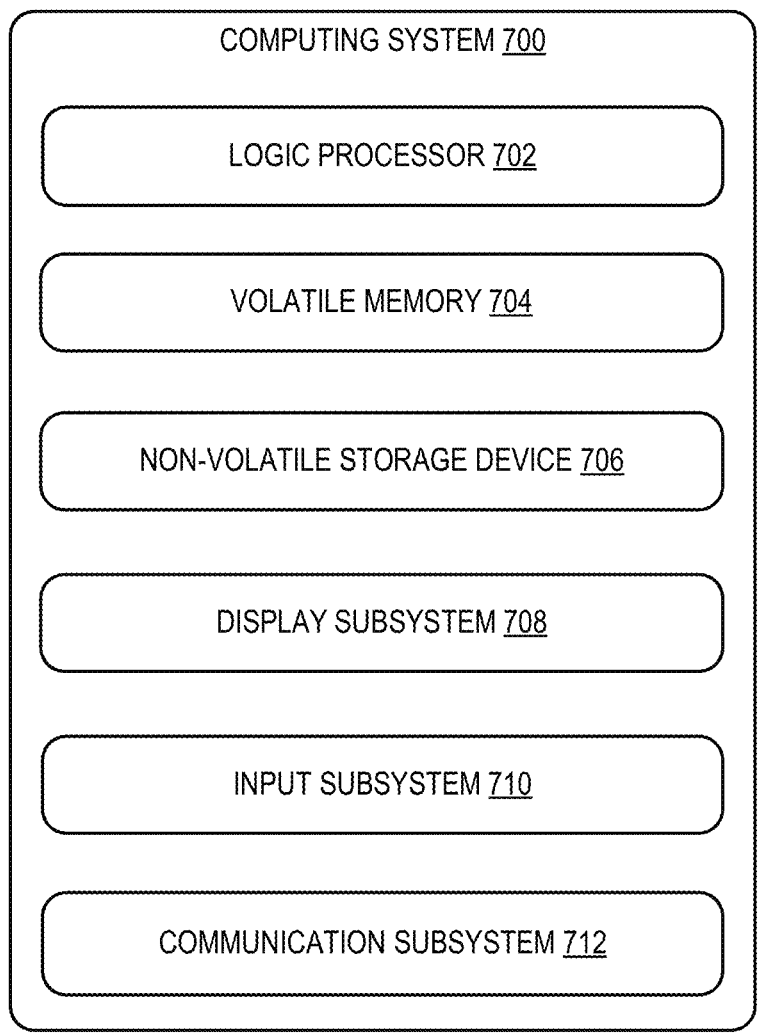
FIG. 10 shows an example computing environment of the present disclosure.

FIG. 10 schematically shows a non-limiting embodiment of a computing system 700 that can enact one or more of the methods and processes described above. Computing system 700 is shown in simplified form. Computing system 700 may embody the training computing system 100, computing device 200, and the client computing device 214 described above and illustrated in FIGS. 1 and 2, respectively. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702, volatile memory 704, and a non-volatile storage device 706. Computing system 700 may optionally include a display subsystem 708, input subsystem 710, communication subsystem 712, and/or other components not shown in FIG. 10.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 702 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

The following paragraphs provide additional support for the claims of the subject application. One aspect provides an incremental video highlights detection system comprising a processor and memory of a computing device, the processor being configured to execute a program using portions of memory to receive an input video, sample video frames from the input video, extract frame-wise spatial features from the video frames using a convolutional neural network, extract a frame-wise temporal feature for each video frame, aggregate the frame-wise spatial features and the frame-wise temporal feature for each video frame to provide a temporal context to the frame-wise spatial features, input the aggregated frame-wise spatial features and the frame-wise temporal feature for each video frame into a transformer encoder to obtain temporal-aware feature representations of the video frames, input the feature representations into a feedforward network model to obtain feedforward-transformed features, obtain a parameter by inputting each feedforward-transformed feature and a set of highlight prototypes into a function comparing the feedforward-transformed features to the set of highlight prototypes, classify the video frames as highlights based on the parameter calculated using the function comparing the feedforward-transformed features to the set of highlight prototypes, and output the classification of the video frames, where the convolutional neural network, the transformer encoder, and the feedforward network model are incrementally trained so that the highlight prototypes are trained from weights learned in previous training stages. In this aspect, additionally or alternatively, a cross-entropy loss may be used to optimize the feedforward network model through gradient back propagation. In this aspect, additionally or alternatively, the gradient back propagation may be performed through the following formula $$\mathcal{L}_{cls} = -\frac{1}{N}\sum_{i=1}^{N} y_i \cdot \log(P_H) + (1 - y_i) \cdot \log(1 - P_H),$$

where $\mathcal{L}_{cls}$ represents the cross-entropy loss, N represents the size of training video frames, $y_i$ equals 1 if the i-th video frame is classified as highlights, $y_i$ equals 0 if the i-th video frame is classified as non-highlights, and $P_H$ is a probability expressing a confidence of classifying the i-th video frame as highlights. In this aspect, additionally or alternatively, $P_H$ may be expressed as the following formulas $$P_H = \frac{\exp(-d_H)}{\exp(-d_H) + \exp(-d_V)},$$

$$d_H = \min_{i=1:k} d(g_\phi(h), H_i), \text{ and } d_V = \min_{i=1:k} d(g_\phi(h), V_i),$$

where h represents the feature representations, $g_\phi(h)$ represents the feedforward-transformed features, $H_i$ is a highlight prototype, $d(g_\phi(h), H_i)$ is a distance between the feedforward-transformed features and the highlight prototype, $V_i$ is a non-highlight prototype, and $d(g_\phi(h), V_i)$ is a distance between the feedforward-transformed features and the non-highlight prototype. In this aspect, additionally or alternatively, the convolutional neural network, the transformer encoder, the highlight prototypes and the non-highlight prototypes may be trained at each of a plurality of training stages by receiving training video frames from a training data set, inputting the training video frames into the convolutional neural network to extract sample frame-wise spatial features from the training video frames, extracting a training frame-wise temporal feature for each training video frame, aggregating the training frame-wise spatial features and the training video frames frame-wise temporal feature for each training video frame to provide a temporal context to the training frame-wise spatial features, inputting the aggregated training frame-wise spatial features and the training frame-wise temporal features into the transformer encoder to obtain temporal-aware training feature representations of the training video frames, inputting the training feature representations into the feedforward network model to obtain training feedforward-transformed features, inputting the training feedforward-transformed features, the highlight prototypes, and the non-highlight prototypes into a minimax loss function to calculate a loss, and inputting the calculated loss into parameter updating functions to update parameters of the convolutional neural network, parameters of the transformer encoder, parameters of the feedforward network model, parameters of the highlight prototypes, and parameters of the non-highlight prototypes, respectively. In this aspect, additionally or alternatively, the minimax loss function may include a product of an empirical Lagrangian variable and a difference between a set of highlight prototypes in a current training stage and a set of highlight prototypes in a previous training state, and a difference between a set of non-highlight prototypes in the current training stage and a set of non-highlight prototypes in the previous training state. In this aspect, additionally or alternatively, the minimax loss function may be expressed as the following formulas $$S^{(T)} = (\theta^{(T)}, \phi^{(T)}, \pi^{(T)}), S^{(T)} = \max_\lambda \min_{\theta,\phi,\pi} L(\theta, \phi, \pi, \lambda),$$

$$\text{and } S^{(T)} = \max_\lambda \min_{\theta,\phi,\pi} \mathcal{L}_{cls}(\theta, \phi, \pi) + \lambda[d(\pi^{(T-1)}, \pi^T) - \gamma],$$

where $S^{(T)}$ represents an optimal solution in training stage T which is a calculated loss, $\theta$ represents the parameters of the convolutional neural network and the parameters of the transformer encoder, $\phi$ represents the parameters of the feedforward network model, $\lambda$ represents the empirical Lagrangian variable, T represents the current training stage, T-1 represents the previous training stage previous to the current training stage, $\pi$ represents the set of highlight prototypes and the set of non-highlight prototypes, and $d(\pi^{(T-1)}, \pi^T)$ represents a distance between the set of highlight prototypes in the current training stage and the set of highlight prototypes in the previous training stage, and a distance between the set of non-highlight prototypes in the current training stage and the set of non-highlight prototypes in the previous training stage. In this aspect, additionally or alternatively, $d(\pi^{(T-1)}, \pi^T)$ may be calculated by the following formula $$d(\pi^{(T-1)}, \pi^T) = \frac{1}{k}\sum_{i=1}^{k}\sqrt{\sum_{j=1}^{m}(\pi_{i,j}^{(T-1)} - \pi_{i,j}^{(T)})^2}.$$

In this aspect, additionally or alternatively, the parameter updating functions may include the following formulas $$\theta \leftarrow \theta - \eta\frac{\partial \mathcal{L}_{cls}(\theta, \phi, \pi)}{\partial \theta}, \phi \leftarrow \phi - \eta\frac{\partial \mathcal{L}_{cls}(\theta, \phi, \pi)}{\partial \phi},$$

$$\pi \leftarrow \pi - \eta\frac{\partial \mathcal{L}_{cls}(\theta, \phi, \pi, \lambda)}{\partial \theta}, \text{ and } \lambda \leftarrow \max\{\lambda + \eta[d(\pi^{(T-1)}, \pi^T) - \gamma], 0\},$$

where $\theta$ represents the parameters of the convolutional neural network and the parameters of the transformer encoder, $\phi$ represents the parameters of the feedforward network model, $\lambda$ represents the empirical Lagrangian variable, T-1 represents the previous training stage previous to the current training stage T, $\pi$ represents the set of highlight prototypes and the set of non-highlight prototypes, and $\gamma$ represents a tolerable change introduced to the set of highlight prototypes and the set of non-highlight prototypes.

Another aspect provides a method for performing incremental highlights detection in video frames, the method comprising steps to receive an input video, sample video frames from the input video, extract frame-wise spatial features from the video frames using a convolutional neural network, extract a frame-wise temporal feature for each video frame, aggregate the frame-wise spatial features and the frame-wise temporal feature for each video frame to provide a temporal context to the frame-wise spatial features, input the aggregated frame-wise spatial features and the frame-wise temporal features into a transformer encoder to aggregate a temporal context to each frame-wise feature to obtain temporal-aware feature representations of the video frames, input the feature representations into a feedforward network model to obtain feedforward-transformed features, obtain a parameter by inputting each feedforward-transformed feature and a set of highlight prototypes into a function comparing the feedforward-transformed features to the set of highlight prototypes, classify the video frames as highlights or non-highlights based on the parameter calculated using the function comparing the feedforward-transformed features to the set of highlight prototypes, and output the classification of the video frames, where the convolutional neural network, the transformer encoder, and the feedforward network model are incrementally trained so that the highlight prototypes are trained from weights learned in previous training stages. In this aspect, additionally or alternatively, a cross-entropy loss may be used to optimize the feedforward network model through gradient back propagation. In this aspect, additionally or alternatively, a cross-entropy loss may be used to optimize the feedforward network model through gradient back propagation. In this aspect, additionally or alternatively, the gradient back propagation may be performed through the following formula $$\mathcal{L}_{cls} = -\frac{1}{N}\sum_{i=1}^{N} y_i \cdot \log(P_H) + (1-y_i) \cdot \log(1-P_H),$$

where $\mathcal{L}_{cls}$ represents the cross-entropy loss, N represents the size of training video frames, $y_i$ equals 1 if the i-th video frame is classified as highlights, $y_i$ equals 0 if the i-th video frame is classified as non-highlights, and $P_H$ is a probability expressing a confidence of classifying the i-th video frame as highlights. In this aspect, additionally or alternatively, $P_H$ may be expressed as the following formulas $$P_H = \frac{\exp(-d_H)}{\exp(-d_H) + \exp(-d_V)}, d_H = \min_{i=1:k} d(g_\phi(h), H_i), \text{ and } d_V = \min_{i=1:k} d(g_\phi(h), V_i),$$

where h represents the feature representations, $g_\phi(h)$ represents the feedforward-transformed features, $H_i$ is a highlight prototype, $d(g_\phi(h), H_i)$ is a distance between the feedforward-transformed features and the highlight prototype, $V_i$ is a non-highlight prototype, and $d(g_\phi(h), V_i)$ is a distance between the feedforward-transformed features and the non-highlight prototype. In this aspect, additionally or alternatively, the convolutional neural network, the transformer encoder, the highlight prototypes and the non-highlight prototypes may be trained at each of a plurality of training stages by receiving training video frames from a training data set, inputting the training video frames into the convolutional neural network to extract sample frame-wise spatial features from the training video frames, extracting a training frame-wise temporal feature for each training video frame, aggregating the training frame-wise spatial features and the training frame-wise temporal feature for each training video frame to provide a temporal context to the training frame-wise spatial features, inputting the aggregated training frame-wise spatial features and the training frame-wise temporal features into the transformer encoder to obtain temporal-aware training feature representations of the training video frames, inputting the training feature representations into the feedforward network model to obtain training feedforward-transformed features, inputting the training feedforward-transformed features, the highlight prototypes, and the non-highlight prototypes into a minimax loss function to calculate a loss, and inputting the calculated loss into parameter updating functions to update parameters of the convolutional neural network, parameters of the transformer encoder, parameters of the feedforward network model, parameters of the highlight prototypes, and parameters of the non-highlight prototypes, respectively. In this aspect, additionally or alternatively, the minimax loss function may include a product of an empirical Lagrangian variable and a difference between a set of highlight prototypes in a current training stage and a set of highlight prototypes in a previous training state, and a difference between a set of non-highlight prototypes in the current training stage and a set of non-highlight prototypes in the previous training state. In this aspect, additionally or alternatively, the minimax loss function may be expressed as the following formulas $$S^{(T)} = (\theta^{(T)}, \phi^{(T)}, \pi^{(T)}), S^{(T)} = \max_\lambda \min_{\theta,\phi,\pi} L(\theta, \phi, \pi, \lambda), \text{ and } S^{(T)} = \max_\lambda \min_{\theta,\phi,\pi} \mathcal{L}_{cls}(\theta, \phi, \pi) + \lambda[d(\pi^{(T-1)}, \pi^T) - \gamma],$$

where $S^{(T)}$ represents an optimal solution in training stage T which is a calculated loss, θ represents the parameters of the convolutional neural network and the parameters of the transformer encoder, ϕ represents the parameters of the feedforward network model, λ represents the empirical Lagrangian variable, T represents the current training stage, T-1 represents the previous training stage previous to the current training stage, π represents the set of highlight prototypes and the set of non-highlight prototypes, and $d(\pi^{(T-1)}, \pi^T)$ represents a distance between the set of highlight prototypes in the current training stage and the set of highlight prototypes in the previous training stage, and a distance between the set of non-highlight prototypes in the current training stage and the set of non-highlight prototypes in the previous training stage. In this aspect, additionally or alternatively, the parameter updating functions may include the following formulas $$\theta \leftarrow \theta - \eta \frac{\partial \mathcal{L}_{cls}(\theta, \phi, \pi)}{\partial \theta}, \phi \leftarrow \phi - \eta \frac{\partial \mathcal{L}_{cls}(\theta, \phi, \pi)}{\partial \phi}, \pi \leftarrow \pi - \eta \frac{\partial L(\theta, \phi, \pi, \lambda)}{\partial \pi}, \text{ and } \lambda \leftarrow \max\{\lambda + \eta[d(\pi^{(T-1)}, \pi^T) - \gamma], 0\},$$

where θ represents the parameters of the convolutional neural network and the parameters of the transformer encoder, ϕ represents the parameters of the feedforward network model, λ represents the empirical Lagrangian variable, T-1 represents the previous training stage previous to the current training stage T, π represents the set of highlight prototypes and the set of non-highlight prototypes, and γ represents a tolerable change introduced to the set of highlight prototypes and the set of non-highlight prototypes.

Another aspect provides an incremental video highlights detection system comprising a processor and memory of a computing device, the processor being configured to execute a program using portions of memory to receive an input video of video frames, extract frame-wise spatial features from the video frames using a convolutional neural network, extract a frame-wise temporal feature for each video frame, aggregate the frame-wise spatial features and the frame-wise temporal feature for each video frame to provide a temporal context to the frame-wise spatial features, input the aggregated frame-wise spatial features and the frame-wise temporal features into a transformer encoder to aggregate a temporal context to each frame-wise feature to obtain temporal-aware feature representations of the video frames, input the feature representations into a feedforward network model to obtain feedforward-transformed features, calculate a distance between each feedforward-transformed feature and a set of highlight prototypes to obtain highlight pairwise distances between the feedforward-transformed features and the set of highlight prototypes, classify the video frames as highlights based on the obtained highlight pairwise distances, and output the classification of the video frames. In this aspect, additionally or alternatively, the distance between each feedforward-transformed feature and the set of highlight prototypes may be calculated by the following formula $$d(l, \pi) = \frac{1}{k}\sum_{i=1}^{k}\sqrt{\sum_{j=1}^{m}(l_{i,j} - \pi_{i,j})^2},$$

where l represents the feature representation, and $\pi$ represents the set of highlight prototypes.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

It will be appreciated that "and/or" as used herein refers to the logical disjunction operation, and thus A and/or B has the following truth table.

| A | B | A and/or B |
|---|---|---|
| T | T | T |
| T | F | T |
| F | T | T |
| F | F | F |

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An incremental video highlights detection system comprising:
a processor and memory of a computing device, the processor being configured to execute a program using portions of memory to:
receive an input video;
sample video frames from the input video;
extract frame-wise spatial features from the video frames using a convolutional neural network;
extract a frame-wise temporal feature for each video frame;
aggregate the frame-wise spatial features and the frame-wise temporal feature for each video frame to provide a temporal context to the frame-wise spatial features;
input the aggregated frame-wise spatial features and the frame-wise temporal feature for each video frame into a transformer encoder to obtain temporal-aware feature representations of the video frames;
input the feature representations into a feedforward network model to obtain feedforward-transformed features;
obtain a parameter by inputting each feedforward-transformed feature and a set of highlight prototypes into a function comparing the feedforward-transformed features to the set of highlight prototypes;
classify the video frames as highlights based on the parameter calculated using the function comparing the feedforward-transformed features to the set of highlight prototypes, wherein the parameter is calculated using a distance function comparing a highlight pair-wise distance between each feedforward-transformed feature and the set of highlight prototypes with a non-highlight pair-wise distance between the feedforward-transformed feature and a set of non-highlight prototypes, the video frames being classified as highlights based on the highlight pair-wise distance and the non-highlight pair-wise distance; and
output the classification of the video frames, wherein
the convolutional neural network, the transformer encoder, and the feedforward network model are incrementally trained so that the highlight prototypes are trained from weights learned in previous training stages; and
each highlight prototype in the set of highlight prototypes is a representative feature vector learned from training video frames annotated as containing highlights, and each non-highlight prototype in the set of non-highlight prototypes is a representative feature vector learned from training video frames annotated as not containing highlights.

2. The incremental video highlights detection system of claim 1, wherein a cross-entropy loss is used to optimize the feedforward network model through gradient back propagation.

3. The incremental video highlights detection system of claim 2, wherein the gradient back propagation is performed through the following formula:

$$\mathcal{L}_{cls} = -\frac{1}{N}\sum_{i=1}^{N} y_i \cdot \log(P_H) + (1 - y_i) \cdot \log(1 - P_H),$$

wherein
$\mathcal{L}_{cls}$ represents the cross-entropy loss;
N represents the size of training video frames;
$y_i$ equals 1 if the i-th video frame is classified as highlights;
$y_i$ equals 0 if the i-th video frame is classified as non-highlights; and
$P_H$ is a probability expressing a confidence of classifying the i-th video frame as highlights.

4. The incremental video highlights detection system of claim 3, wherein $P_H$ is expressed as the following formulas:

$$P_H = \frac{\exp(-d_H)}{\exp(-d_H) + \exp(-d_V)};$$

$$d_H = \min_{i=1:k} d(g_\phi(h), H_i); \text{ and}$$

$$d_V = \min_{i=1:k} d(g_\phi(h), V_i),$$

wherein
h represents the feature representations;
$g_\phi(h)$ represents the feedforward-transformed features;
$H_i$ is a highlight prototype;
$d(g_\phi(h), H_i)$ is a distance between the feedforward-transformed features and the highlight prototype;
$V_i$ is a non-highlight prototype; and
$d(g_\phi(h), V_i)$ is a distance between the feedforward-transformed features and the non-highlight prototype.

5. The incremental video highlights detection system of claim 3, wherein the convolutional neural network, the transformer encoder, the highlight prototypes and the non-highlight prototypes are trained at each of a plurality of training stages by:

receiving training video frames from a training data set;
inputting the training video frames into the convolutional neural network to extract sample frame-wise spatial features from the training video frames;
extracting a training frame-wise temporal feature for each training video frame;
aggregating the training frame-wise spatial features and the training video frames frame-wise temporal feature for each training video frame to provide a temporal context to the training frame-wise spatial features;
inputting the aggregated training frame-wise spatial features and the training frame-wise temporal features into the transformer encoder to obtain temporal-aware training feature representations of the training video frames;
inputting the training feature representations into the feedforward network model to obtain training feedforward-transformed features;
inputting the training feedforward-transformed features, the highlight prototypes, and the non-highlight prototypes into a minimax loss function to calculate a loss; and
inputting the calculated loss into parameter updating functions to update parameters of the convolutional neural network, parameters of the transformer encoder, parameters of the feedforward network model, parameters of the highlight prototypes, and parameters of the non-highlight prototypes, respectively.

6. The incremental video highlights detection system of claim 5, wherein the minimax loss function includes a product of an empirical Lagrangian variable and a difference between a set of highlight prototypes in a current training stage and a set of highlight prototypes in a previous training state, and a difference between a set of non-highlight prototypes in the current training stage and a set of non-highlight prototypes in the previous training state.

7. The incremental video highlights detection system of claim 6, wherein the minimax loss function is expressed as the following formulas:

$$S^{(T)} = (\theta^{(T)}, \phi^{(T)}, \pi^{(T)});$$

$$S^{(T)} = \max_{\lambda} \min_{\theta,\phi,\pi} L(\theta, \phi, \pi, \lambda); \text{ and}$$

$$S^{(T)} = \max_{\lambda} \min_{\theta,\phi,\pi} \mathcal{L}_{cls}(\theta, \phi, \pi) + \lambda[d(\pi^{(T-1)}, \pi^T) - \gamma],$$

wherein
$S^{(T)}$ represents an optimal solution in training stage T which is a calculated loss;
θ represents the parameters of the convolutional neural network and the parameters of the transformer encoder;
φ represents the parameters of the feedforward network model;
λ represents the empirical Lagrangian variable;
T represents the current training stage;
T-1 represents the previous training stage previous to the current training stage;
π represents the set of highlight prototypes and the set of non-highlight prototypes; and
$d(\pi^{(T-1)}, \pi^T)$ represents a distance between the set of highlight prototypes in the current training stage and the set of highlight prototypes in the previous training stage, and a distance between the set of non-highlight prototypes in the current training stage and the set of non-highlight prototypes in the previous training stage.

8. The incremental video highlights detection system of claim 7, wherein $d(\pi^{(T-1)}, \pi^T)$ is calculated by the following formula:

$$d(\pi^{(T-1)}, \pi^T) = \frac{1}{k}\sum_{i=1}^{k}\sqrt{\sum_{j=1}^{m}(\pi_{i,j}^{(T-1)} - \pi_{i,j}^{(T)})^2}.$$

9. The incremental video highlights detection system of claim 7, wherein the parameter updating functions include the following formulas:

$$\theta \leftarrow \theta - \eta\frac{\partial \mathcal{L}_{cls}(\theta, \phi, \pi)}{\partial \theta};$$

$$\phi \leftarrow \phi - \eta\frac{\partial \mathcal{L}_{cls}(\theta, \phi, \pi)}{\partial \phi};$$

$$\pi \leftarrow \pi - \eta\frac{\partial L(\theta, \phi, \pi, \lambda)}{\partial \pi}; \text{ and}$$

$$\lambda \leftarrow \max\{\lambda + \eta[d(\pi^{(T-1)}, \pi^T) - \gamma], 0\},$$

wherein
θ represents the parameters of the convolutional neural network and the parameters of the transformer encoder;
φ represents the parameters of the feedforward network model;
λ represents the empirical Lagrangian variable;
T-1 represents the previous training stage previous to the current training stage T;
π represents the set of highlight prototypes and the set of non-highlight prototypes; and
γ represents a tolerable change introduced to the set of highlight prototypes and the set of non-highlight prototypes.

10. A method for performing incremental highlights detection in video frames, the method comprising steps to:
receive an input video;
sample video frames from the input video;
extract frame-wise spatial features from the video frames using a convolutional neural network;
extract a frame-wise temporal feature for each video frame;
aggregate the frame-wise spatial features and the frame-wise temporal feature for each video frame to provide a temporal context to the frame-wise spatial features;
input the aggregated frame-wise spatial features and the frame-wise temporal features into a transformer encoder to aggregate a temporal context to each frame-wise feature to obtain temporal-aware feature representations of the video frames;
input the feature representations into a feedforward network model to obtain feedforward-transformed features;
obtain a parameter by inputting each feedforward-transformed feature and a set of highlight prototypes into a function comparing the feedforward-transformed features to the set of highlight prototypes;
classify the video frames as highlights or non-highlights based on the parameter calculated using the function comparing the feedforward-transformed features to the set of highlight prototypes, wherein the parameter is calculated using a distance function comparing a highlight pair-wise distance between each feedforward-transformed feature and the set of highlight prototypes with a non-highlight pair-wise distance between the feedforward-transformed feature and a set of non-highlight prototypes, the video frames being classified as highlights based on the highlight pair-wise distance and the non-highlight pair-wise distance; and output the classification of the video frames, wherein the convolutional neural network, the transformer encoder, and the feedforward network model are incrementally trained so that the highlight prototypes are trained from weights learned in previous training stages; and each highlight prototype in the set of highlight prototypes is a representative feature vector learned from training video frames annotated as containing highlights, and each non-highlight prototype in the set of non-highlight prototypes is a representative feature vector learned from training video frames annotated as not containing highlights.

11. The method of claim 10, wherein a cross-entropy loss is used to optimize the feedforward network model through gradient back propagation.

12. The method of claim 11, wherein the gradient back propagation is performed through the following formula:

$$\mathcal{L}_{cls} = -\frac{1}{N}\sum_{i=1}^{N} y_i \cdot \log(P_H) + (1-y_i) \cdot \log(1-P_H),$$

wherein
$\mathcal{L}_{cls}$ represents the cross-entropy loss;
N represents the size of training video frames;
$y_i$ equals 1 if the i-th video frame is classified as highlights;
$y_i$ equals 0 if the i-th video frame is classified as non-highlights; and
$P_H$ is a probability expressing a confidence of classifying the i-th video frame as highlights.

13. The method of claim 12, wherein $P_H$ is expressed as the following formulas:

$$P_H = \frac{\exp(-d_H)}{\exp(-d_H)+\exp(-d_V)};$$

$$d_H = \min_{i=1:k} d(g_\phi(h), H_i); \text{ and}$$

$$d_V = \min_{i=1:k} d(g_\phi(h), V_i),$$

wherein
h represents the feature representations;
$g_\phi(h)$ represents the feedforward-transformed features;
$H_i$ is a highlight prototype;
$d(g_\phi(h), H_i)$ is a distance between the feedforward-transformed features and the highlight prototype;
$V_i$ is a non-highlight prototype; and
$d(g_\phi(h), V_i)$ is a distance between the feedforward-transformed features and the non-highlight prototype.

14. The method of claim 12, wherein the convolutional neural network, the transformer encoder, the highlight prototypes and the non-highlight prototypes are trained at each of a plurality of training stages by:

receiving training video frames from a training data set;
inputting the training video frames into the convolutional neural network to extract sample frame-wise spatial features from the training video frames;
extracting a training frame-wise temporal feature for each training video frame;

aggregating the training frame-wise spatial features and the training frame-wise temporal feature for each training video frame to provide a temporal context to the training frame-wise spatial features;

inputting the aggregated training frame-wise spatial features and the training frame-wise temporal features into the transformer encoder to obtain temporal-aware training feature representations of the training video frames;

inputting the training feature representations into the feedforward network model to obtain training feedforward-transformed features;

inputting the training feedforward-transformed features, the highlight prototypes, and the non-highlight prototypes into a minimax loss function to calculate a loss; and inputting the calculated loss into parameter updating functions to update parameters of the convolutional neural network, parameters of the transformer encoder, parameters of the feedforward network model, parameters of the highlight prototypes, and parameters of the non-highlight prototypes, respectively.

15. The method of claim 14, wherein the minimax loss function includes a product of an empirical Lagrangian variable and a difference between a set of highlight prototypes in a current training stage and a set of highlight prototypes in a previous training state, and a difference between a set of non-highlight prototypes in the current training stage and a set of non-highlight prototypes in the previous training state.

16. The method of claim 15, wherein the minimax loss function is expressed as the following formulas:

$$S^{(T)} = (\theta^{(T)}, \phi^{(T)}, \pi^{(T)});$$

$$S^{(T)} = \max_{\lambda}\min_{\theta,\phi,\pi} L(\theta, \phi, \pi, \lambda); \text{ and}$$

$$S^{(T)} = \max_{\lambda}\min_{\theta,\phi,\pi} \mathcal{L}_{cls}(\theta, \phi, \pi) + \lambda[d(\pi^{(T-1)}, \pi^T) - \gamma],$$

wherein
$S^{(T)}$ represents an optimal solution in training stage T which is a calculated loss;
θ represents the parameters of the convolutional neural network and the parameters of the transformer encoder;
φ represents the parameters of the feedforward network model;
λ represents the empirical Lagrangian variable;
T represents the current training stage;
T-1 represents the previous training stage previous to the current training stage;
π represents the set of highlight prototypes and the set of non-highlight prototypes; and
$d(\pi^{(T-1)}, \pi^T)$ represents a distance between the set of highlight prototypes in the current training stage and the set of highlight prototypes in the previous training stage, and a distance between the set of non-highlight prototypes in the current training stage and the set of non-highlight prototypes in the previous training stage.

17. The method of claim 16, wherein $d(\pi^{(T-1)}, \pi^T)$ is calculated by the following formula:

$$d(\pi^{(T-1)}, \pi^T) = \frac{1}{k}\sum_{i=1}^{k}\sqrt{\sum_{j=1}^{m}(\pi_{i,j}^{(T-1)} - \pi_{i,j}^{(T)})^2}.$$

18. The method of claim 16, wherein the parameter updating functions include the following formulas:

$$\theta \leftarrow \theta - \eta \frac{\partial \mathcal{L}_{cls}(\theta, \phi, \pi)}{\partial \theta};$$

$$\phi \leftarrow \phi - \eta \frac{\partial \mathcal{L}_{cls}(\theta, \phi, \pi)}{\partial \phi};$$

$$\pi \leftarrow \pi - \eta \frac{\partial L(\theta, \phi, \pi, \lambda)}{\partial \pi}; \text{ and}$$

$$\lambda \leftarrow \max\{\lambda + \eta[d(\pi^{(T-1)}, \pi^T) - \gamma], 0\},$$

wherein
- θ represents the parameters of the convolutional neural network and the parameters of the transformer encoder;
- φ represents the parameters of the feedforward network model;
- λ represents the empirical Lagrangian variable;
- T-1 represents the previous training stage previous to the current training stage T;
- π represents the set of highlight prototypes and the set of non-highlight prototypes; and
- γ represents a tolerable change introduced to the set of highlight prototypes and the set of non-highlight prototypes.

19. An incremental video highlights detection system comprising:
   a processor and memory of a computing device, the processor being configured to execute a program using portions of memory to:
      receive an input video of video frames;
      extract frame-wise spatial features from the video frames using a convolutional neural network;
      extract a frame-wise temporal feature for each video frame;
      aggregate the frame-wise spatial features and the frame-wise temporal feature for each video frame to provide a temporal context to the frame-wise spatial features;
      input the aggregated frame-wise spatial features and the frame-wise temporal features into a transformer encoder to aggregate a temporal context to each frame-wise feature to obtain temporal-aware feature representations of the video frames;
      input the feature representations into a feedforward network model to obtain feedforward-transformed features;
      calculate a distance between each feedforward-transformed feature and a set of highlight prototypes to obtain highlight pair-wise distances between the feedforward-transformed features and the set of highlight prototypes, and further calculate a distance between each feedforward-transformed feature and a set of non-highlight prototypes to obtain non-highlight pair-wise distances between the feedforward-transformed features and the set of non-highlight prototypes;
      classify the video frames as highlights based on the highlight pair-wise distances and the non-highlight pair-wise distances; and
      output the classification of the video frames, wherein each highlight prototype in the set of highlight prototypes is a representative feature vector learned from training video frames annotated as containing highlights, and each non-highlight prototype in the set of non-highlight prototypes is a representative feature vector learned from training video frames annotated as not containing highlights.

20. The incremental video highlights detection system of claim 19, wherein the distance between each feedforward-transformed feature and the set of highlight prototypes is calculated by the following formula:

$$d(l, \pi) = \frac{1}{k} \sum_{i=1}^{k} \sqrt{\sum_{j=1}^{m} (l_{i,j} - \pi_{i,j})^2},$$

wherein
- l represents the feature representation; and
- π represents the set of highlight prototypes.

* * * * *